(12) United States Patent
Hoyle et al.

(10) Patent No.: US 6,240,867 B1
(45) Date of Patent: Jun. 5, 2001

(54) DISTRIBUTED MACHINERY STRUCTURE FOR SHIPS

(75) Inventors: Scott Baxter Hoyle, Maple Shade; Michael Anthony McSweeney, Spotswood, both of NJ (US)

(73) Assignee: Lockheed Martin Corporation, Moorestown, NJ (US)

( * ) Notice: Subject to any disclaimer, the term of this patent is extended or adjusted under 35 U.S.C. 154(b) by 0 days.

(21) Appl. No.: 09/571,346

(22) Filed: May 16, 2000

(51) Int. Cl.[7] .................................................. B63B 3/00
(52) U.S. Cl. ............................................................ 114/65 R
(58) Field of Search .................... 114/65 R, 71, 114/77 R, 78

(56) References Cited

U.S. PATENT DOCUMENTS

| | | | |
|---|---|---|---|
| 5,165,359 | * 11/1992 | Tandeo et al. | 114/65 R |
| 5,417,597 | * 5/1995 | Levedahl | 114/65 R |
| 6,142,090 | * 11/2000 | Jakuba et al. | 114/65 R |

* cited by examiner

*Primary Examiner*—Stephen Avila
(74) *Attorney, Agent, or Firm*—W. H. Meise; S. D. Weinstein

(57) ABSTRACT

A ship is divided into plural watertight zones. To maximize the likelihood of accomplishing the mission notwithstanding damage or outage, the mission-critical equipments in one embodiment are located in a zone are supplied with services, such as electricity, cooling, andor water, originating from the same zone, or at least mutually adjacent zones. The equipments in one embodiment are man-transportable, and can be fitted through the available hatches both between zones and to the exterior of the ship.

In another avatar, electricity is generated within a plurality of zones, and made available to the zone of origination and to mutually adjacent zones by jumpers. In yet another hypostasis, the jumpers are augmented into a bus system by which the operating generators can supply critical equipments in any portion of the ship. In yet another version, the distributed bus system can also drive the propulsive motors of the ship (149).

16 Claims, 10 Drawing Sheets

DISTRIBUTED MACHINERY STRUCTURE FOR SHIPS

FIELD OF THE INVENTION

This invention relates to the service facilities of waterborne vessels, and more particularly to layouts of cooling, electrical, water, and like services for ease of servicing andor reliability.

BACKGROUND OF THE INVENTION

Modern seagoing vessels, such as cargo, passenger, and war ships, have service requirements such as supply of electricity, cooling andor heating, fresh water supply, and waste management. In the Arleigh Burke class of destroyers, for example, all of these requirements are present. Electrical generation in an electric-drive vessel is often provided by large engine-driven generators which supply the propeller motors, and a portion of the generated power is tapped from the generators for ancillary or auxiliary purposes, such as "hotel" services. Hotel services includes such services as space heating andor cooling, lighting, and fresh water supply. Such a system requires an extensive power distribution system providing adequate power throughout the ship.

Air conditioning and heating services in ships are often provided by one or more heat exchangers or chillers which reject heat from chilled fresh water to sea water pumped from outside the ship. The chilled water is then distributed to points of use, which desirably should be near the heat exchanger to avoid excessive fluid runs and the associated efficiency losses. These requirements are often met by a few air conditioning systems spaced about the ship. Such air conditioning units may be very large. In the abovementioned Arleigh Burke class ships, four such units are used, each of about 200 tons (2.5 million BTU) capacity. These units are spaced about the ship in locations central to regions of use.

Fresh water for ships is now provided by reverse-osmosis filtration or by boilers, both of which are often large centralized units, requiring distribution systems for the fresh water. Similarly, waste management regulation no longer permits overboard discharge of untreated waste.

Improved service systems are desired.

SUMMARY OF THE INVENTION

A ship according to an aspect of the invention includes a plurality of bulkheads separating the ship (or more properly, its hull) into various nominally watertight zones. A watertight zone is the volume bounded by the hull and a watertight upper deck, lying between watertight vertical or nearly-vertical bulkheads. In this context, the uppermost deck which forms the upper boundary of such a watertight zone may be considered to be a bulkhead. Most of the zones are used for various "essential" purposes attributable to a mission of the ship, but one or more, such as the forwardmost compartment, is provided as a buffer against the possibility of frontal collision, and this forwardmost zone(s) is often used, for the most part, for storage, such as for anchor chain, and for other nonessential uses. A plurality of passageways of standard sizes extend within at least some of the zones, and extend between at least some of the zones and adjacent zones, and between at least some of the zones and the outside of the ship. Those of the passageways which extend between zones, or which extend between a zone and the outside of the ship are fitted with watertight fittings, hatches or "doors." In a ship according to an aspect of the invention, various critical users of cooling are distributed about the zones of the ship. In this context, a critical user of the cooling service is one which, if not provided with cooling, directly and adversely affects a mission of the ship. A critical use in a combat vessel might be, for example, a cooling system which keeps a radar equipment at proper operating temperature. A plurality of chilled fluid producers are provided. A chilled fluid producer may be, for example, an air conditioning unit for generating cooled air, or a chilled-water producer, for generating chilled water for cooling a heat sink of an electrical apparatus. Each of the chilled fluid producers has outer dimensions selected to pass through one of the passageways, so that dimensionally, any one of the chilled fluid producers can be moved about the ship, or removed from the ship, without structural modification of the ship. Each of the chilled fluid producers is located in one of the zones, and each of the zones contains at least three of the chilled fluid producers. The number of the chilled fluid producers in each of the zones is at least equal to that number which provides an amount of cooling exceeding the amount of the cooling required by the critical users of the zone in which the chilled fluid providers are located. Thus, cooling service is provided in each zone, so that damage to another zone cannot cut off the cooling service to an undamaged zone, and the mission of the equipments in the undamaged zone can continue, since damage to the cooling service equipment in one zone does not affect service to the adjacent zone.

In a particular avatar of the invention, each of the chilled fluid producers requires a flow of water or other medium into which heat can be rejected. The ship further includes, within each zone, first and second sources of heat exchange fluid, which is ordinarily water. The heat exchange water may be sea water pumped directly from outside the ship, or it may be fresh water (or, of course, some other heat exchange fluid) in thermal communication with sea water pumped from outside of the ship, so that the heat exchange water ultimately exchanges heat with the ocean. Plumbing is coupled to the first and second heat exchange fluid sources and to the chilled fluid producers within the zone, so that (a) at least one of the chilled fluid producers receives heat exchange water from the first source of heat exchange water within that zone, and (b) at least one other of the chilled fluid producers receives heat exchange water from the second source of heat exchange water within that zone.

In a preferred embodiment of the avatar, the first source of heat exchange water (or at least its distribution system) within a first zone is, or lies, adjacent a first side of a vertically oriented bulkhead separating the first zone from a second zone, and the ship further includes a third source of heat exchange water located in the second zone, adjacent a second side of the vertically oriented bulkhead. A heat exchange fluid path extends through the bulkhead near the first and third sources of heat exchange water, or at least their distribution systems. The heat exchange fluid path through the bulkhead is closed off to avoid the potential for flooding between zones, and is available for connection to one of the first and third sources of heat exchange water and to at least one of the chilled fluid producers in the adjacent and first zones, respectively. This arrangement allows damage to one of the heat exchange fluid sources in one zone to be bypassed, by connecting the chilled fluid producers or cooling fluid generators in the one zone (the zone in which the damaged heat exchange fluid source(s) lie) to the (presumably undamaged) source of heat exchange fluid in the next adjacent zone. In this preferred embodiment, each of the first and third sources of heat exchange water comprises a vertically oriented distribution pipe for the flow of the heat exchange water between a location below the sources of chilled fluid to a location at the same height as the sources of chilled fluid, together with a pump located near the bottom of the distribution pipe, for pumping the heat exchange water to the chilled fluid provider. As mentioned, the heat exchange fluid may be fresh or salt water. If the heat exchange fluid circulating through the chilled fluid producers or cooling fluid generators is other than salt water, the arrangement may also include a heat-exchange-fluid-to-salt-water heat exchanger located anywhere along the vertically oriented distribution pipe, but preferably near the bottom thereof. The preferred heat exchange fluid is fresh water. In one version, two heat exchangers may be provided in each zone. The heat exchangers are normally located low in the ship, and are rugged, so a single heat exchanger may be used to provide the heat exchange fluid for both distribution systems, or most preferably, the sea chest provides salt water to a heat exchanger having two independent paths for the flow of the heat exchange medium.

In another embodiment of the invention, a zoned ship includes a fuel source associated with each of the zones, and at least first and second electrical power generators located in each of the zones and coupled to the fuel source, for providing electrical power to the chilled fluid producers within corresponding zones. At least one of the chilled fluid producers is coupled to the first electrical power generator, and at least one other of the chilled fluid producers is coupled to the second electrical power generator. In another manifestation of the invention, the ship has a fuel source associated with each of the zones. First and second electrical power generators are located in each of the zones and coupled to the fuel source, for providing electrical power to the critical users within the corresponding zone. At least one of the critical users is coupled to the first electrical power generator, and at least one of the critical users is coupled to the second electrical power generator.

Another embodiment of the invention lies in a ship comprising a plurality of bulkheads separating the ship into various zones which are nominally watertight. Various critical users of electricity are distributed throughout the ship, in at least some of the zones. In this context, a critical user of the service is one which, if not provided with services, directly and adversely affects a mission of the ship. A source of fuel is associated with each the zones which contains one or more of the critical users of electricity. At least one fuel-operated electrical generator is associated with each one of the zones containing one or more critical users of electricity. The electrical generator associated with a given zone is fueled from the source of fuel associated with the one of the zones which the electrical generator occupies. The electrical generator is dimensioned to produce at least a particular amount of electrical power, where the particular amount of electrical power is the sum of (a) the amount of electrical power required by the critical users of electricity within the associated one of the zones, plus (b) half the amount of electrical power required by the critical users of electrical power of that one of the zones adjacent to the associated one of the zones which has the larger electrical power consumption of the two. The embodiment also includes an electrical jumper system for controllably coupling the electrical generator of each one of the zones with at least some of the critical users of electricity of the two zones adjacent the one of the zones. This arrangement allows the critical user in a zone in which the electrical generator is damaged to continue to operate, with electrical power provided to the critical equipment of the zone with damaged generator by way of jumpers from the two adjacent (presumably undamaged) zones. Since each undamaged generator is capable of supplying the amount of electrical power required for its own critical users, plus half the load of the adjacent zone, all critical operations can continue notwithstanding damage to the generators in one or more non-contiguous zones.

In a particularly advantageous manifestation, sufficient interconnections among the electrical jumper system are provided so that the electrical jumper system constitutes a bus by which the electrical power produced by all on-line ones of the electrical generators of a plurality of the zones can be combined for distribution among the critical users of electricity.

In another hypostasis of the invention, the ship includes electrically energized motive or drive means, such as a propeller. The electrically energized motive means may be one or more electrical motors. A controllable means is provided for coupling the bus with the electrically energized drive means, whereby the on-line ones of the electrical generators can provide propulsive power for the ship. In a preferred version of this hypostasis, the amount of electrical power produced together by the electrical generators exceeds the amount required by (a) the propulsive drive and (b) the other equipments of the ship, including the mission-critical equipment, by an amount equalling the amount of power lost by a worst-case scenario of damage to the electrical generating systems. In another version of this hypostasis, a main fuel-operated motor-generator is controllably coupled to the propeller drive means, for providing propulsion during those intervals during which the electrical generators are not providing propulsion power for the ship.

Another embodiment according to the invention is that of a ship having one or more missions, and including a plurality of watertight bulkheads dividing the ship into zones. Mission-critical equipment is located in at least some of the zones. The mission-critical equipment requires services in the form of at least one of air conditioning, fresh water, and electrical power. In this embodiment, service equipment is located within each of the zones. The service equipment of each one of the zones is sufficient to independently provide the at least one of air conditioning, fresh water, and electrical power to the mission-critical equipment located in the one of the zones in which the service equipment is located, whereby damage to any part of the ship other than the one of the zones in which the service equipment is located does not interfere with that part of the mission of the mission-critical equipment located in the one of the zones. In a particular version of this embodiment, the service equipment comprises a fuel-consuming generator, and the service equipment further comprises a tank of fuel for the generator.

A ship according to another embodiment of the invention has one or more missions. The ship comprises a plurality of watertight bulkheads dividing the ship into zones, and mission-critical equipment located in at least some of the zones. The mission-critical equipment requires services in the form of at least one of air conditioning, fresh water, and electrical power. Service equipment is located within each of the zones, so that the service equipment of each one of the zones is sufficient to independently provide (a) the at least one of air conditioning, fresh water, and electrical power to the mission-critical equipment located in the one of the zones, together with (b) half the amount of the at least one of air conditioning, fresh water, and electrical power required by that one of the zones adjacent the one of the zones, whereby damage to the services of any single one of the zones of the ship does not interfere with the supply of services to that part of the mission-critical equipment located in the single one of the zones.

DESCRIPTION OF THE INVENTION

Figure 1:
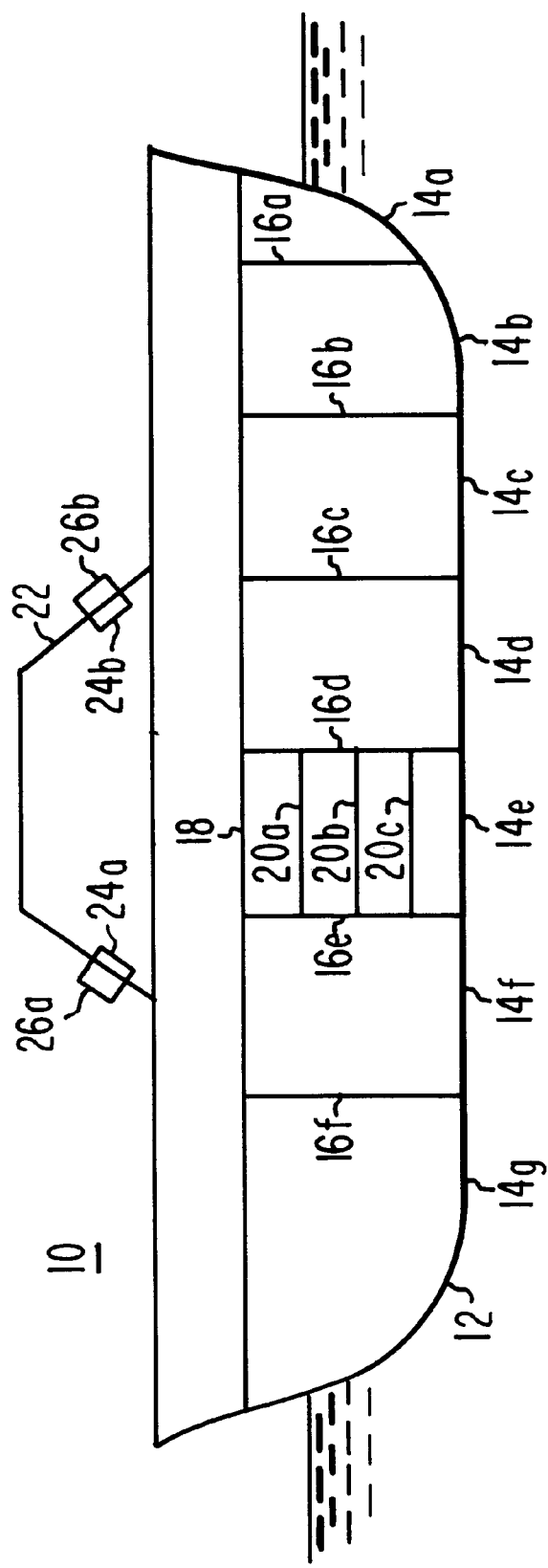
FIG. 1 is a simplified cross-sectional side elevation view of a ship divided into various nominally watertight zones, and including sealable hatches extending between various zones and other zones andor the outside.

The invention herein is based upon the understanding that current ships are equipped in a manner which is not necessarily optimum for ease of maintenance or survivability. More particularly, services are supplied to mission-critical equipments within the watertight zones from centralized sources, as for example air conditioning in the aforementioned Arleigh Burke class destroyer is provided by four large air conditioners. These air conditioners are so large that they are built into the ship at the time of construction, and can only be removed by cutting through the ship structure and employing cranes to effectuate the removal. These four units are arranged to provide service to four "zones" which extend over multiple watertight zones, so damage to one such air conditioner may adversely affect operation of undamaged critical equipment located at a distance from the air conditioner, in an undamaged watertight zone. The maintenance principle which is applied during normal operations of Arleigh Burke type destroyers is one of "repair" rather than "replacement," because replacement of such large items built into the ship cannot be done except at dock. Repair work requires more skilled labor than simple replacement, so the "repair" paradigm requires that the crew include a cadre of skilled air conditioner repairmen. Another disadvantage of the "repair" paradigm is that the ship must carry a large number of repair parts, and the cataloging and storage of such parts requires additional personnel. Yet another disadvantage of the "repair" paradigm is that of distribution: the chilled fluid, be it air or water, must be carried from its source to the location of the user equipment, however remote. The plumbing required for such distribution requires its own cadre of repairmen and replacement parts. The plumbing, which runs between watertight zones, is a fertile source for potential leaks which, taken as a whole, put the ship at increased risk in the event of damage. An aspect of the invention includes the principle of distribution of the sources of services so that each watertight zone in which services are required by mission-critical equipment or personnel is provided with such services, inasmuch as possible, by sources located in the same watertight zone as the users of services. By having redundancy within a zone and between zones, the number of single-point catastrophic failure points are reduced, so there are no "vital" or critical points within the ship. Each service requirement in a watertight zone is backed up by similar capacity in other zones. Within each zone, the services are provided by equipment provided in relatively small-capacity units, compared with the large-capacity prior-art units, which allows for graceful degradation as the incremental units fail. Thus, each zone is provided with sufficient such incremental-equipment capacity to provide not only for the needs of the zone in which the capacity is installed, but also sufficient to take up at least a portion of the needs of one of the adjacent zones.

According to an aspect of the invention, the services for a watertight zone of a vessel are provided, inasmuch as possible, by a plurality of man-portable or man-transportable equipments, each having dimensions such that they may be taken from and into the ship's zones through the regular hatches and passageways. This criterion allows a failed equipment unit to be replaced by a corresponding functioning unit held in reserve, rather than requiring in situ repair. This "replacement" paradigm allows early return to service, and also allows the failed unit to be repaired off-line or in a maintenance shop, where more equipment is available, and better work can presumably be done. Of course, the failed unit may be held until the ship docks, and sent to a specialized repair shop for service. An additional advantage is that undamaged service capacity available in one zone may readily be transferred to a zone in which the service equipment is damaged, if the service user equipment should be deemed to be more important to the mission of the ship than the user equipment in the zone with the undamaged service equipment.

In the context of this aspect of the invention, the term "man-portable" or "man-transportable" refers to equipment with a weight which can be moved by a gang of men using simple rigging. The number of men who constitute a gang is determined by the maximum number of men who can "lay their hands on" or gain effective access to the equipment in the confines of the smallest passageway through which the equipment must be moved for replacement. Simple rigging, of course, includes rollers, A-frames with tackle, and the like, which likewise can be no larger than can be accommodated in the room in which the equipment is installed, andor in the passageways to be traversed. In some cases, rigging may include already-extant equipment normally used for other purposes, such as, for example, the equipment provided in a battleship for moving ammunition. In one context, a man-transportable weight might be considered to be the 150 pounds which is allowable for two-man carry, but with larger crews together with rigging, such a weight might be considerably greater.

Since the sizes and weights of the service providing equipments are established by the abovementioned man-portability and passageway dimension requirements, the operating capacity of such equipment will be limited. For example, very efficient turbine-driven generators manufactured by Pratt & Whitney are available which weigh only 600 pounds, and are capable of producing 400 kilowatts of electricity. A plurality of two such generators might be provided in a watertight zone or compartment to provide a total of 800 kilowatts for use within the compartment or zone. Further, air-conditioning or chilled-water producers operable to reject heat to a flow of water are available in moderate dimensions and weights, as for example a 3 ton (36,000 BTU) apparatus weighing 140 pounds and having overall dimensions of 29 inches in length, 19 inches height, and 17.5 inches width is available as model FMAC 36R from Flagship Marine, 901 Martin Downs Blvd, Suite 306, Palm City, Fla. 34990. Any number of such units may be operated in parallel in order to achieve the desired capacity. In one laboratory set-up, the chilled-fluid producers were analogous to plural conventional air-conditioning units, which are operated in parallel simply because their cold-air outlets open into the same space. They are unlike conventional air-conditioning units, in that they reject heat into a flow of heat-transfer fluid. Each unit can be independently controlled with a separate switch, or in the context of a remotely controlled apparatus, by individual relays. Chilled-liquid producing apparatuses can be paralleled in an analogous manner, by simply combining low rate flows of chilled coolant from each individual unit, to thereby generate a larger flow.

FIG. 1 represents a ship 10, in which the hull is designated 12, and the hull space is divided into a plurality of nominally watertight zones 14a, 14b, 14c, 14d, 14e, 14f, and 14g by vertically oriented bulkheads 16a, 16b, 16c, 16d, 16e, and 16f, acting in consort with a horizontally disposed bulkhead or deck 18. Deck 18 is known as a "damage control" deck in the context of a warship or a "clear" deck in the context of a civilian ship. Within each watertight zone, there may be a number of vertically stacked decks, as illustrated, for example, by decks 20a, 20b, and 20c in watertight zone 14e lying between bulkheads 16d and 16e. Similar decks may lie above deck 18, and within a superstructure 22. The main propulsion engine(s) (not illustrated) is(are) ordinarily located below the highest portion of the superstructure, so that aspiration of air may be accomplished with least likelihood of ingestion of water under heavy sea conditions, and with the shortest aspiration run lengths. In many cases, the main propulsion engines may be located in rearmost zone 14g, but they may be located in any zone, and connected to rear-mounted propellers by drive shafts.

A superstructure 22 in FIG. 1 has a pair of hatches or portals 24a, 24b, allowing ingress to and egress from the interior of ship 10, and these hatches are fitted with nominally watertight doors or hatch covers 26a and 26b, respectively. The foremost zone, namely zone 14a, is not ordinarily occupied by any important equipment, for its purpose is to provide a buffer against frontal damage in a collision. The rearmost watertight zone 14g, as mentioned, is often reserved for the propulsion engines, but it should be understood that other locations are possible for the propulsive arrangements, as for example in the case of propulsive pods or Voight Shneider drive. The remaining zones 14b, 14c, 14d, 14e, and 14f are available for use by equipments which aid in the accomplishing the mission or missions of the ship 10. It should be noted that, within each zone, each deck may (or may not) be subdivided by vertically oriented walls (not illustrated), which are not necessarily watertight, into various compartments usable for various different purposes, as for example sleeping quarters, radar equipment housing, food storage, meeting rooms, repair part storage, ammunition storage, and innumerable other purposes.

Figure 2A:
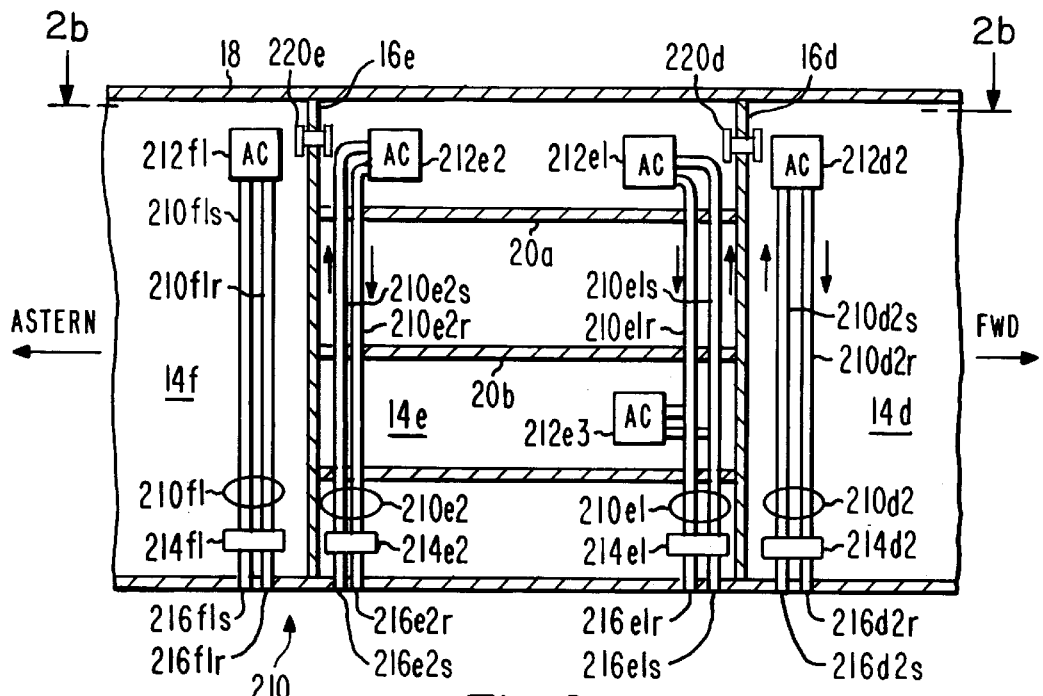
FIG. 2a is a simplified elevation view of a section of the ship of FIG. 1, illustrating one watertight zone and portions of two adjacent zones, with heat-exchange fluid in the form of seawater flowing in two vertically oriented distribution pipes within each zone.
Figure 2B:
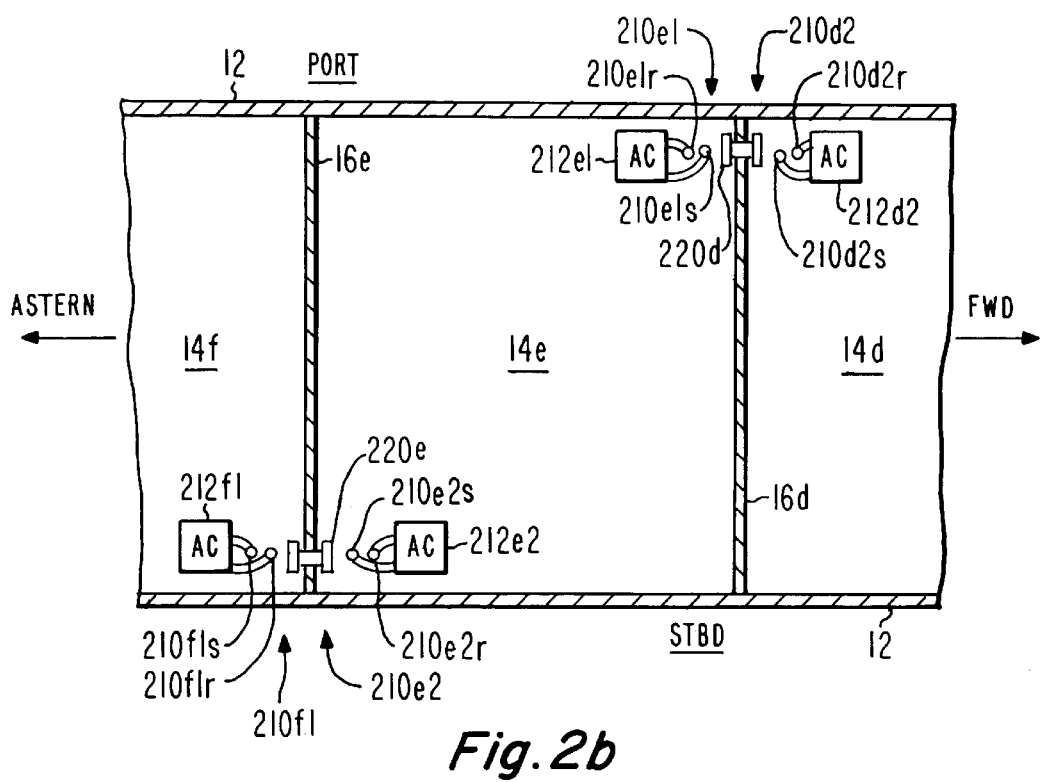
FIG. 2b is a plan view of an upper portion of the portion of the ship illustrated in FIG. 2a, taken along view lines 2b—2b, showing that the two vertically-oriented distribution pipes are placed at opposed corners of the zone to minimize the likelihood of damage to the zone affecting both pipes.

FIG. 2a is an elevation view of a portion of the ship of FIG. 1, providing additional detail, and FIG. 2b is a corresponding plan view of an upper deck of the portion of FIG. 2a. The upper deck 20a of illustrative watertight zone 14e is illustrated in FIGS. 2a and 2b, together with portions of the two adjacent zones 14d and 14f. As illustrated, a set 210 including a plurality of vertically disposed salt-water distribution pipe pairs 210d2, 210e1, 210e2, and 210f1 extend from locations near the bottom of the hull, through various decks, as may be required, to upper levels at which heat exchange coolant may be required. In FIGS. 2a and 2b, the uppermost deck 20a within zone 14e contains air conditioners (AC) 212e1 and 212e2, the illustrated portion of adjacent zone 14d contains an air conditioner 212d2, and the illustrated portion of adjacent zone 14f contains an air conditioner 212f1. The adjacent zones may also contain further air conditioners, which are not illustrated. The vertically oriented distribution pipes are in pairs, with a first pipe of each pair providing cool heat transfer fluid, in the form of sea water, from a sea water aperture, and with the other pipe of the pair returning the salt water to the sea after heat transfer thereto. Thus, distribution pipe pair 210d2, located in the aft or rearmost portion of zone 14d, near bulkhead 16d, consists of a cool water supply pipe 210d2s together with a warmed water return pipe 210d2r. A pump 214d2 provides the energy for moving water through pipe pair 212d2 to and from pipe apertures 216d2s and 216d2r opening into the sea. Similarly, distribution pipe pair 210e1, located in the forward end of zone 14e adjacent bulkhead 16d, consists of a cool water supply pipe 210e1s together with a warmed water return pipe 210e1r. A pump 214e1 provides the energy for moving water through pipe pair 210e1 to and from pipe apertures 216e1s and 216e1r into the sea. At the rear of watertight zone 14e and near or against bulkhead 16e, distribution pipe pair 210e2 consists of a cool water supply pipe 210e2s together with a warmed water return pipe 210e2r. A pump 214e2 provides the energy for moving water through pipe pair 210e2 to and from pipe apertures 216e2s and 216e2r into the sea. For completeness, distribution pipe pair 210f1, located at the front of zone 14f adjacent bulkhead 16e, consists of a cool water supply pipe 210f1s together with a warmed water return pipe 210f1r. A pump 214f1 provides the energy for moving water through pipe pair 210f1 to and from pipe apertures 216f1s and 216f1r into the sea. It will be noted that each watertight compartment contains two sets of coolant water distribution pipes, as for example zone 14e contains distribution pipe pairs 210e1 and 210e2. Near the top front of zone 14e, a first air conditioner apparatus, which as mentioned above may consist of a plurality of man-portable air conditioners operated in parallel, is attached to the coolant water supply pipe 210e1s, and is also attached to the return water pipe 210e1r. Near the top rear of zone 14e, an air conditioning apparatus 212e2 is connected to cooling water supply pipe 210e2s and to return pipe 210e2r. Similarly, the rear of zone 14d contains an air conditioning apparatus 212d2, which is connected to coolant distribution supply pipe 210d2s and return pipe 210d2r. The front of zone 14f contains an air conditioning apparatus 212f1, which is connected to coolant distribution supply pipe 210f1s and to return pipe 210f1r.

According to an aspect of the invention, each air conditioning apparatus within a watertight zone receives a flow of coolant from a distribution pipe. Each relevant zone contains redundant paralleled cooling units, as zone 14e contains cooling apparatuses 212e1 and 212e2, each consisting of a plurality of paralleled chilled fluid producers or cooling units, and each relevant zone also contains redundant cooling water distribution, as zone 14e contains distribution pipe pairs 210e1 and 210e2. Within each watertight compartment or zone, one of the air conditioning apparatuses is on the port (PORT) side, and the other is on the starboard (STBD) side, and within such a pair, one of the air conditioning apparatuses is located forward in the zone, "next to" a bulkhead, and the other is in the aft or rear of the zone, also adjacent to a bulkhead. Within mutually adjacent zones, the forward one of the air conditioning pairs alternates from port to starboard, and the rearmost one of the air conditioning pairs similarly alternates. Thus, in the arrangement of FIG. 2b, the rearmost air conditioning apparatus 212d2 of zone 14d is located to port (and its corresponding forward air conditioning apparatus (not illustrated) must therefore be located on the starboard side). In the next adjacent zone 14e, the forward air conditioning apparatus 212e1 is located to port, just on the other side of the bulkhead 16d from the rearmost air conditioning apparatus 212d2. At the rear of zone 14e, the air conditioning apparatus 212e2 is located to starboard, adjacent bulkhead 16e. In zone 14f, the forward air conditioning apparatus 212f1 is located to starboard, immediately adjacent the location of rearmost air conditioning apparatus 212e2. The rearmost air conditioning apparatus (not illustrated) of zone 14f must therefore be on the port side. This alternation of the port/starboard locations of the air conditioning apparatuses in a given zone tends to reduce the likelihood that both air conditioning apparatuses within a particular zone will be simultaneously degraded or destroyed by an impact to the ship, since ordinary damage, attributable to a collision or to a missile or projectile strike, tends to be localized. Thus, a collision impact to the port side of the ship at a location adjacent air conditioning apparatus 212e1 may destroy that particular apparatus, but is less likely to affect air conditioning apparatus 212e2, located on the starboard side of the ship at a more rearward position.

According to a further aspect of the invention, the cooling or heat rejection fluid distributed by vertically oriented pipe pairs of set 210 are similarly oriented on opposite sides (port and starboard) of the ship, at locations as much separated in the fore-aft direction as the bounds of the zone reasonably allow. Thus, distribution pipe pair 210d2 is located in a vertical line somewhere near air conditioning apparatus 212d2, and adjacent bulkhead 16d. Distribution pipe pair 210e1 is located on the port side, just across from distribution pipe 210d2. Distribution pipe pair 210e2 is located on the starboard side, just ahead of bulkhead 16e, and distribution pipe pair 210f1 is also to starboard, just behind, or on the other side of bulkhead 16e from pipe pair 210e2. The location of the distribution pipes provides the same kind of protection of the distribution pipes that the alternating locations of the air conditioning apparatuses provides. In addition, the alternation of the port/starboard locations from zone to zone results in mutually adjacent locations of the heat transfer fluid distribution pipes which are adjacent to a given bulkhead. For example, distribution pipe pairs 210d2 and 210e1, on either side of bulkhead 16d in FIG. 2b, are both on the port side of the ship, separated "only" by the bulkhead, and distribution pipe pairs 210e2 and 210f1, on either side of bulkhead 16e, are both on the starboard side, also separated "only" by the bulkhead.

Figure 3A:
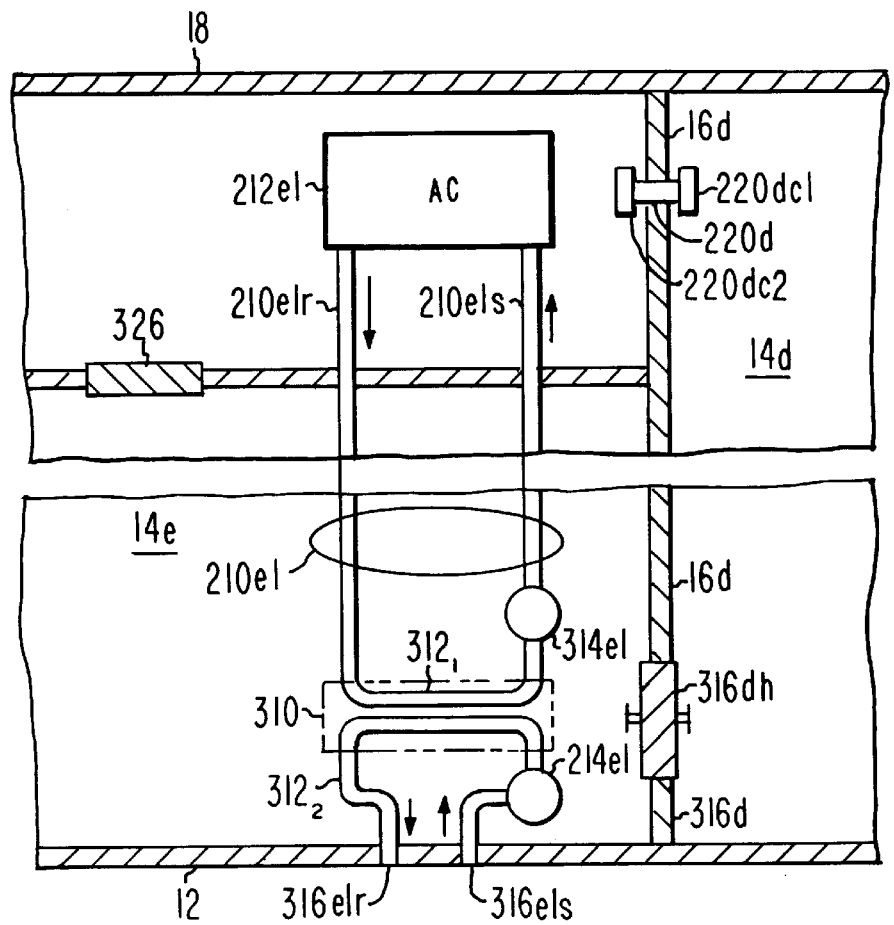
FIG. 3a is a simplified representation of a portion of the arrangement of FIG. 2b, showing the use of a further heat exchanger and pump in association with each of the vertically oriented heat exchange fluid pipes, for allowing the heat exchange fluid flowing to upper portions of the zone to be fresh water or other fluid.

FIG. 3a is a simplified representation of a portion of the arrangement of FIG. 2a, showing the use of a further heat exchanger and pump in association with each of the vertically oriented heat exchange fluid pipes, for allowing the heat exchange fluid flowing to upper portions of the zone to be fresh water or some fluid other than sea water. In FIG. 3a, instead of extending directly through the hull, the source and return distribution pipes 210e1s and 210e1r, respectively, run to a first heat-exchange path 312, of a heat exchanger 310, and heat exchange fluid, in the form, for example, of fresh water, flows through the source and return distribution pipes 210e1s and 210e1r, and through heat exchange path $312_1$, under the impetus of a heat-exchange fluid pump 314e1. Warmed heat-exchange fluid returning to the heat exchanger 310 is cooled by sea water flowing, under the impetus of pump 214e1, into inlet port 316e1s, through heat exchange fluid path $312_2$, and back to the sea through outlet port 316e1r. Those skilled in the art will appreciate that the various fluid paths may include filters, automatic fill devices, and other standard equipment other than that illustrated in FIG. 3a.

A watertight hatch 316d in bulkhead 16d provides access between zones 14e and 14d. In accordance with an aspect of the invention, the hatch has selected dimensions similar to those of hatches 26a and 26b of FIG. 1, so as to allow the passage of man-portable or man-transportable equipments between zones. A further hatch 326 is illustrated in FIG. 3a, which provides access between different portions of zone 14e. Hatch 326 is dimensioned to allow transportation of the equipments between different portions of the zone, but may not need to be watertight.

Figure 3B:
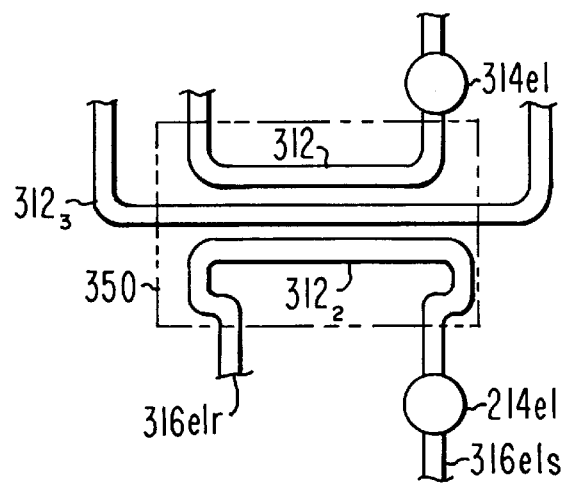
FIG. 3b is a simplified representation of a heat exchanger with multiple independent flow paths.

FIG. 3b illustrates in simplified form a heat exchanger designated 350, which may be used in place of heat exchanger 310 of FIG. 3a. Heat exchanger 350 differs from heat exchanger 310 by virtue of including multiple independent paths for the flow of fluid. More particularly, in addition to heat exchange path $312_1$, which as described in conjunction with FIG. 3a provides a flow of fresh-water heat exchange fluid to air conditioner 212e1, heat exchanger 350 includes an additional path $312_3$, independent of paths $312_1$ and $312_2$, through which fresh-water heat exchange fluid can circulate to some other chilled fluid producer. For example, the fluid in path $312_3$ of FIG. 3b might flow to air conditioner 212e2 in zone 14e of FIG. 2a, thereby eliminating the need for two separate heat exchangers in the zone if other than sea water is to be circulated.

It should be noted, with reference to FIG. 1, that the watertight zones at the fore and aft of the ship (zones 14a and 14g) often have an overhang, and, should critical equipment be installed therein, it may not be possible to provide heat exchange fluid from a lower part of the zone. In such a situation, it may be necessary to provide the fluid from an adjacent zone during normal operation.

Figure 4A:
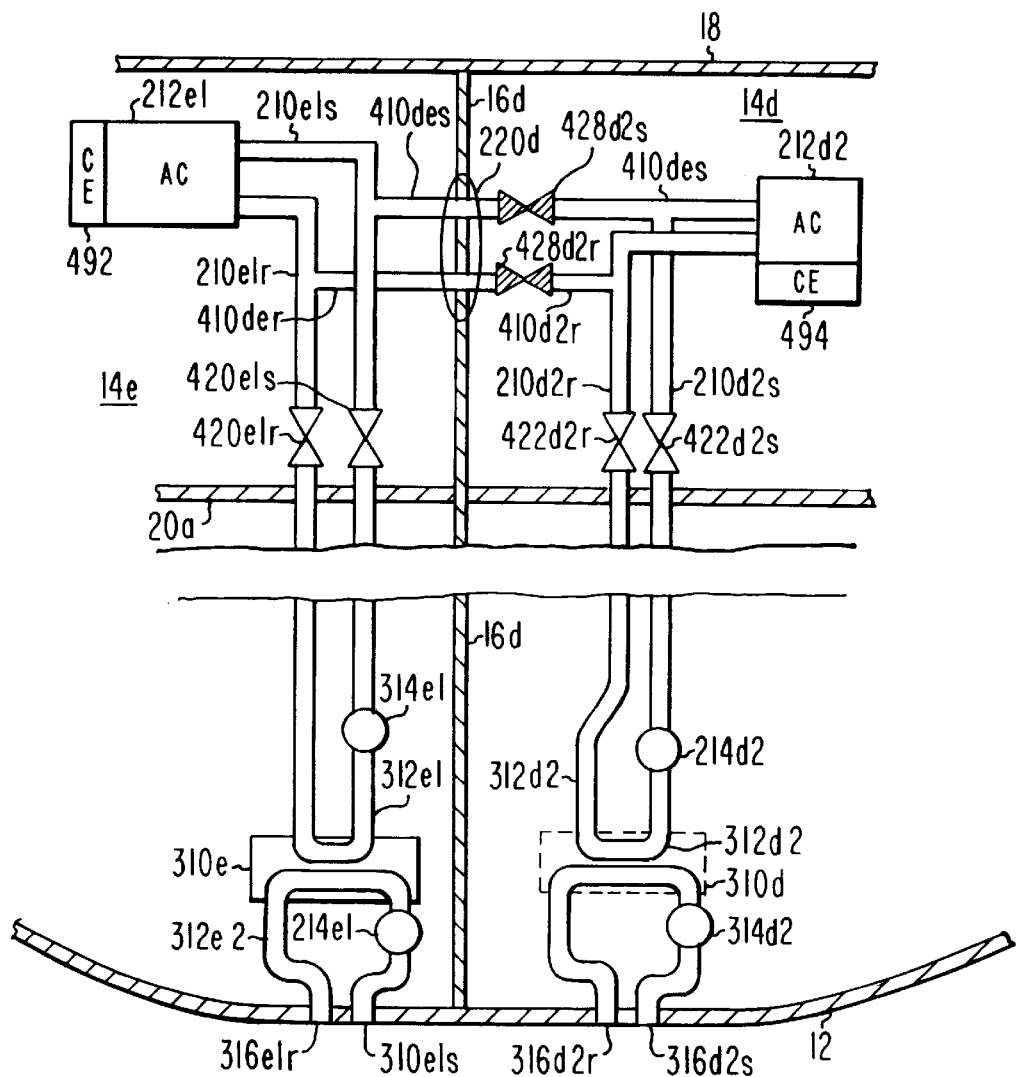
FIG. 4a is a simplified illustration of the critical equipment, chilled fluid producers, bulkhead-penetrating pipes, and the associated plumbing on two sides of a bulkhead dividing one watertight zone from another.
Figure 4B:
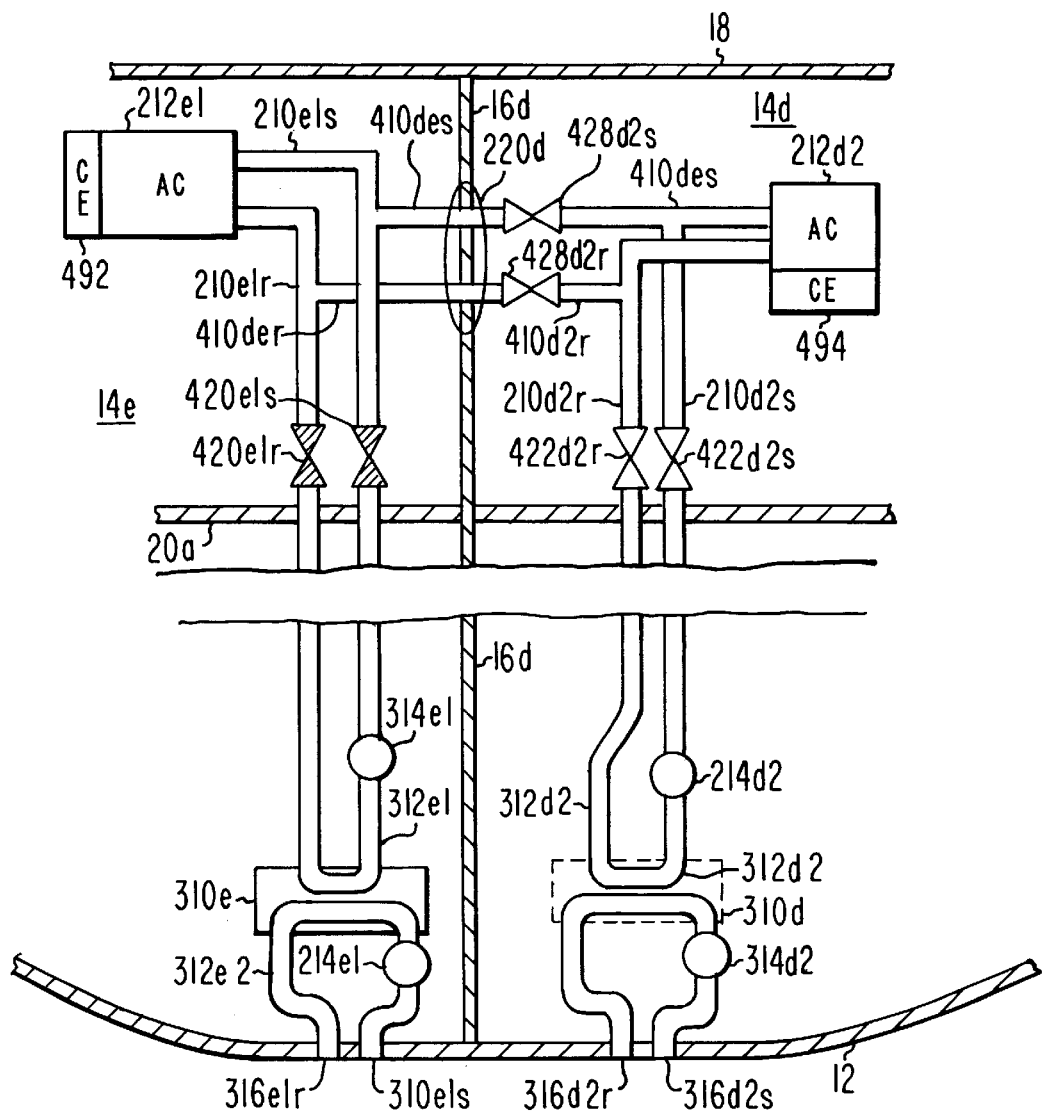
FIG. 4b illustrates the equipment of FIG. 4a reconfigured in response to damage to the heat exchange fluid distribution pipe normally supplying some chilled fluid producers in one of the zones.

According to a further aspect of the invention, the watertight or waterproof bulkheads are pierced by pipes or conduits, such as opening or pipe 220d penetrating bulkhead 16d, and opening or pipe 220e penetrating bulkhead 16e, in FIGS. 2a, 2b, 3a, 4a, and 4b, to allow heat transfer fluid to be exchanged between mutually adjacent watertight zones in the event of a complete or partial failure of a source of heat exchange fluid in a given zone. For this purpose, a source of heat exchange fluid may include a sea chest, if used, the pumps, and the plumbing or distribution system. If simple closed-off apertures are provided, each zone should also be provided with a plurality of preferably flexible pipes or hoses by which temporary interconnections may be made between the intact heat exchange source on one side of a bulkhead and the chilled fluid producers (air conditioners, for example) on the other side of the bulkhead, which are served by a damaged heat exchange fluid source. FIG. 4a is an elevation view of a ship according to an aspect of the invention, in which certain details of the heat-exchange fluid distribution systems are illustrated. In FIG. 4a, valves 422d2r and 422d2s located in the upper portion of zone 14d are connected in pipe paths 210d2r and 210d2s, respectively, to divide the vertical portion of the pipes into upper and lower portions. Similarly, valves 420e1r and 420e1s located in the upper portion of zone 14e are connected in pipe paths 210e1r and 210e1s, respectively, to divide the vertical portion of the pipes into two portions. The opening 220d in bulkhead 16d accommodates two independent pipes. A first pipe, designated 410des, interconnects supply pipes 210d2s and 210e1s by way of a valve 428d2s, and a second pipe, designated 410der, interconnects return pipes 210d2r and 210e1r by way of a valve 428d2r. Naturally, the passage of pipes 410des and 410der through opening 220d in bulkhead 16d is sealed so that the bulkhead remains nominally watertight. As illustrated in FIG. 4a, valves 428d2s and 428d2r are hatched, to thereby indicate that they are in the closed condition, while valves 422d2s and 422d2r, and 420e1s and 420e1r are illustrated without hatching, to thereby indicate that they are in an open or fluid-passing state. The arrangement as illustrated in FIG. 4a, therefore, can be viewed as being one for normal operation, in which each heat-exchange fluid source 310d and 310e provides pumped heat exchange fluid for air conditioners or other chilled fluid producers in their respective zones, and in which there is no circulation of heat-exchange fluid between zones d and e. Under this condition, the critical equipment (CE) 492 and 494 associated with each air conditioner 212e1 and 212d2, respectively, is properly serviced, and should be available for use. The arrangement of FIG. 4b illustrates the same structure as that of FIG. 4a, with the valves in a condition which represents damage, represented as 490, below deck 20a in zone e. As illustrated in FIG. 4b, valves 420e1s and 420e1r are hatched, to indicate that they are closed off, and valves 428d2s and 428d2r are not hatched, to indicate that they are open. With this configuration, heat-exchange fluid can circulate in zone 14d as in the undamaged condition of FIG. 4a. In addition, heat-exchange fluid can circulate from zone 14d, through opening 220d in bulkhead 16d, and through air conditioner 212e1, without loss of fluid downward to damaged region 490 because of the closing of valves 420e1s and 420e1r. Thus, operation of air conditioner 212e1 can continue notwithstanding the damage to its "own" source of heat-exchange fluid. Consequently, operation of the critical equipment (CE) 492 associated with air conditioner 212e1 can continue notwithstanding the damage. Those skilled in the art will recognize that many more valves than those illustrated may be necessary for most applications on a large ship, generally at the locations at which pipes penetrate bulkheads or decks, but the valves illustrated in FIGS. 4a and 4b suffice to illustrate the principle of this aspect of the invention.

Figure 5A:
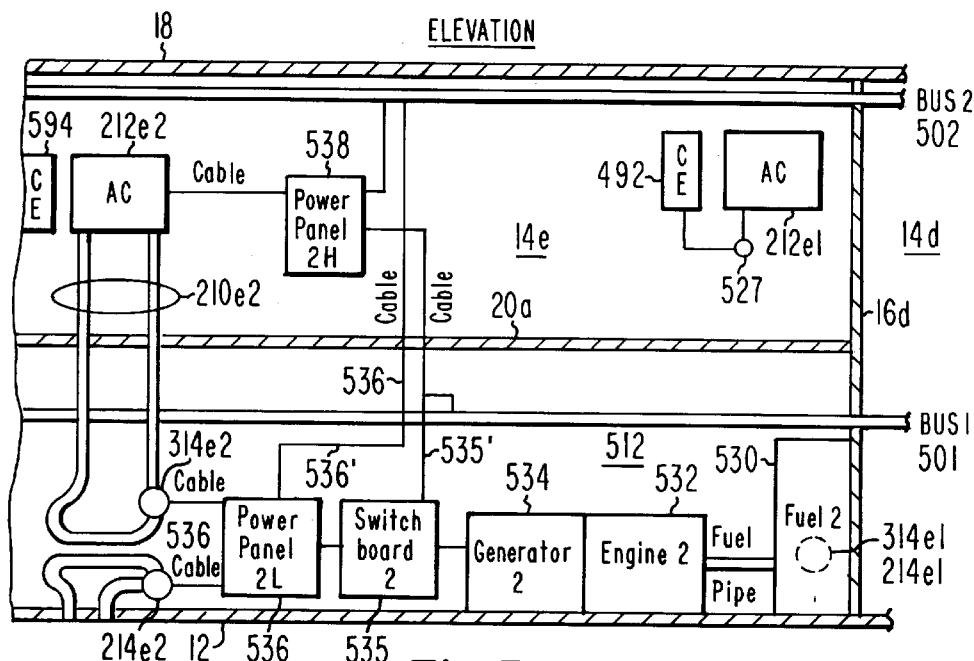
FIG. 5a is a simplified elevation view.
Figure 5B:
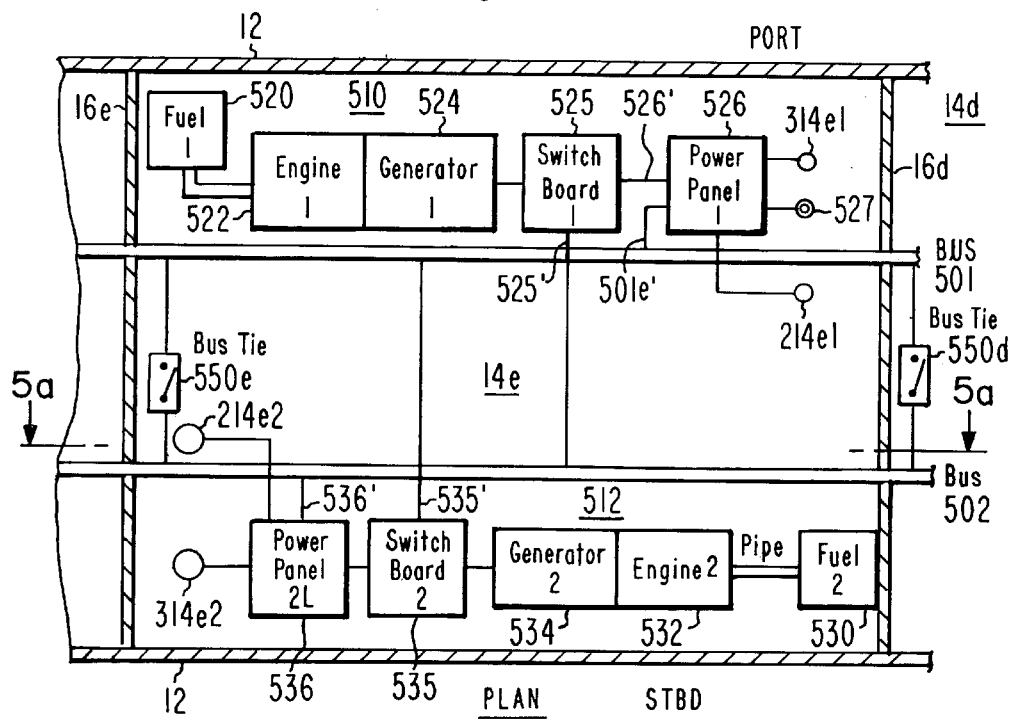
FIG. 5b is a simplified plan view illustrating a watertight zone of a ship according to an aspect of the invention, in which two electrical generators are disposed for supplying power to chilled fluid producers and other users.

FIG. 5a is a simplified elevation view of a portion of a ship including plural fuel sources and electrical power generators, and FIG. 5b is a corresponding plan view, according to another aspect of the invention. In FIGS. 5a and 5b, watertight zone 14e can be seen to include first and second electrical buses 501 and 502 extending longitudinally or in a fore-aft direction through the zone, with bus 501 lying near the bottom of the hull on the port side, and bus 502 lying near the uppermost deck or bulkhead 18 on the starboard side. Each bus 501 and 502 includes a plurality of conductors (not separately illustrated), sufficient to handle the number of phases of the electrical system. Thus, a direct-current or single-phase alternating-current system might require only two independent conductors within a particular bus, while a polyphase system may require as many independent conductors as one more than the number of phases. Thus, either bus 501 or bus 502 alone suffices to carry power among the various zones, for operation of equipments therein, and damage to one or the other of the buses in a particular zone will not prevent operation of the ship's equipment.

As illustrated in FIGS. 5a and 5b, zone 14e contains two electric generators, designated generally as 510 and 512, both of which are preferably located low in the ship for maximum protection against projectiles arriving parallel with the water's surface, with generator 510 located on the port side, and generator 512 located on the starboard side. Electric generator 510 includes a source of fuel in the form of a tank 520, an engine 522 using the fuel, and an electrical generator 524 driven by engine 522 to produce electricity. Similarly, electric generator 512 includes a source of fuel 530, an engine 532 using the fuel, and an electrical generator 534 driven by engine 532 to produce electricity. Electrical generator 524 has its electrical output routed to a switchboard 525, which is capable of, or can, switch the generator between providing power (by way of a path 526') to a power panel 526 or (by way of a path 525') to bus 502. Power panel 526 accepts power from either switchboard 525 during normal operating conditions by way of path 526', or from bus 501, by way of path 501e', under those conditions in which generator 510 is inoperative or damaged, to provide power to pumps 214e1 andor 314e1, for providing pumping power for producing a flow of heat-exchange coolant as described in conjunction with FIGS. 2a, 2b, and 3a. In addition, power panel 526 provides power by way of a vertically oriented supply cable designated 527 extending to upper portions of zone 14e, to air conditioner 212e1 and to the critical equipment (CE) 492 associated therewith. Similarly, electrical generator 534 on the starboard side has its electrical output routed to a switchboard 535, which can switch the generator between providing power to a power panel 536 and, by way of a path 535', to bus 501. Power panel 536 accepts power from either switchboard 535 during normal operating conditions in which generator 512 is running, or, by way of a path 536', from bus 502 under those conditions in which generator 534 is inoperative or damaged, to provide power to pumps 214e2 andor 314e2, for providing pumping power for producing a flow of heat-exchange coolant as described in conjunction with FIGS. 2a, 2b, and 3a. Chilled fluid producer 212e2 and critical equipment 594 receive power from power panel 538, which in turn receives power from switchboard 535 by way of path 535' when generator 512 is on-line, and from bus 502 when generator 512 is off-line. Power panels or switchboards, such as 535, 536, and 538, which provide for powering a device from disparate sources, are conventional items in common use on shipboard.

Figure 5C:
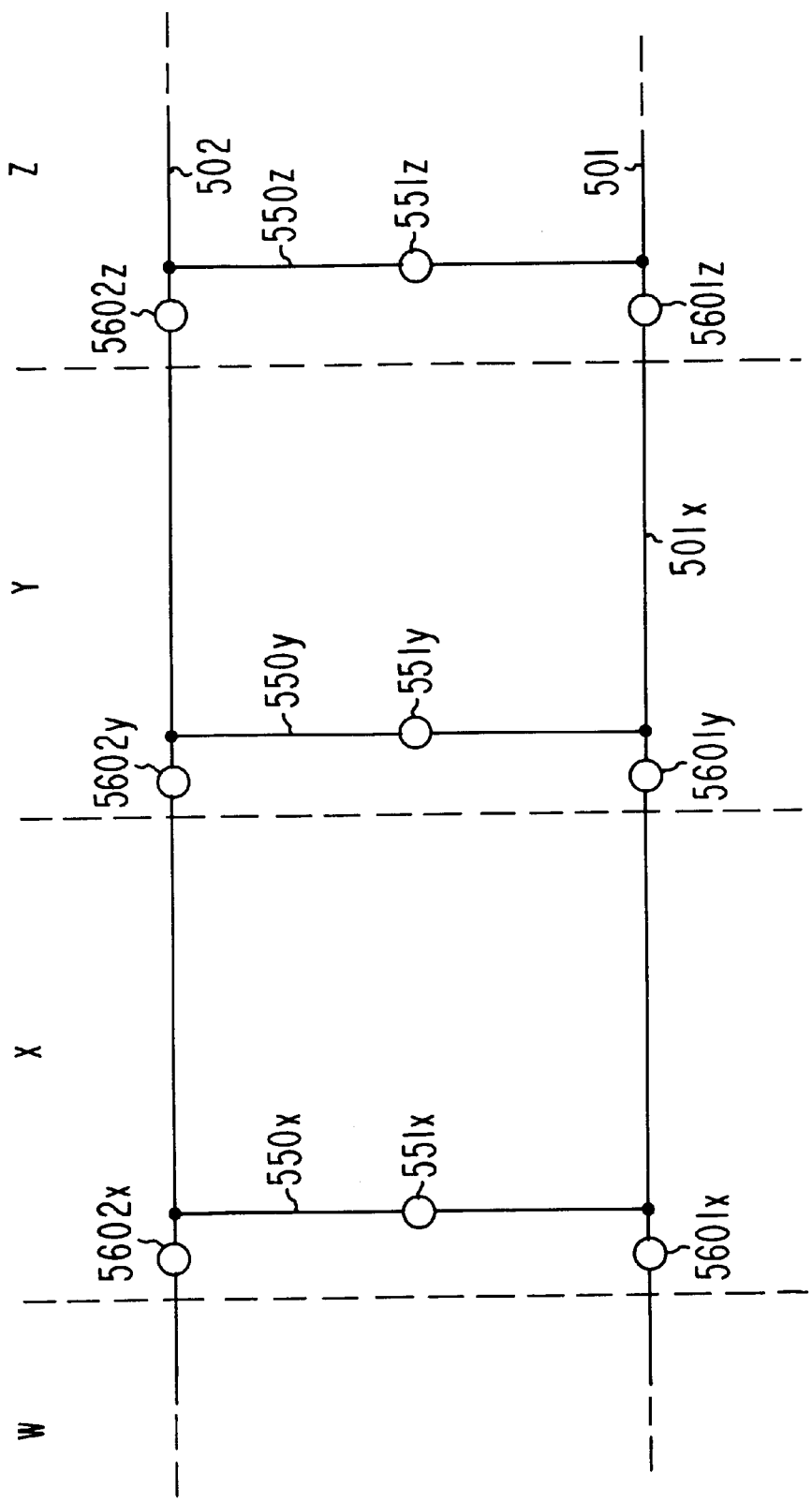
FIG. 5c is a simplified elevation-view representation of the placement of circuit breakers in the buses passing through the various watertight zones.

It will be noted that the illustrative zone of FIGS. 5a and 5b contains a "bus tie" or controllable jumper path 550e connecting bus 501 to bus 502, and adjacent zone 14d also contains a corresponding tie 550d. Each other zone of the ship which either contains critical equipment, or which lies between zones containing critical equipment, will include such a tie. In general, the purpose of these ties is to allow bypassing of a damaged portion of a bus, so that damage to one of the buses in one of the zones can be ameliorated by switching the power flowing through that zone to the undamaged one of the buses. FIG. 5c is a simplified representation of the placement of circuit breakers in the buses passing through the various watertight zones according to another aspect of the invention. In FIG. 5c, buses 501 and 502 are seen to extend through zones W, X, Y, and Z, separated by bulkheads illustrated as dash lines. Bus ties 550x, 550y, and 550z extend between buses 501 and 502 in zones X, Y, and Z, respectively. A circuit breaker is located in each bus tie. More particularly, bus tie 550x has an in-line circuit breaker 551x, bus tie 550y has an in-line circuit breaker 551y, and bus tie 550z has an in-line circuit breaker 551z. A circuit breaker is located in-line with each bus at a location immediately adjacent to a bulkhead in each zone, and between the bulkhead and the location to which the bus tie is tied. For example, circuit breakers 5601x, 5601y, and 5601z are in-line with bus 501 in zones X, Y, and Z, respectively, and circuit breakers 5602x, 5602y, and 5602z are in-line with bus 502 in zones X, Y, and Z, respectively. In normal operation of the bus arrangement, all the circuit breakers may be in the closed (conducting) state, allowing power to be shared by the sources and loads coupled to the buses.

In the event of a short-circuit of a damaged bus, the adjacent circuit breakers will blow or become open to isolate the region with the short-circuit, while the remainder of the system continues to operate. For example if a short-circuit occurs in a portion 502X of bus 502 in the Y zone, as exemplified by an X in FIG. 5c, circuit breakers 5601y, 5601z blow, and bus tie circuit breaker 551y also blows. With these three circuit breakers open, there is no continuity between the shorted bus section 502x and the remainder of the bus system. Power can continue to flow through all bus sections, and between buses, except bus portion 502x. Thus, the functional or operational ones of the generators, wherever located within the ship, can be routed by the dual-bus-with-tie distribution system to undamaged critical equipment andor service equipment for the critical equipment, to maintain maximum mission capacity.

Figure 6A:
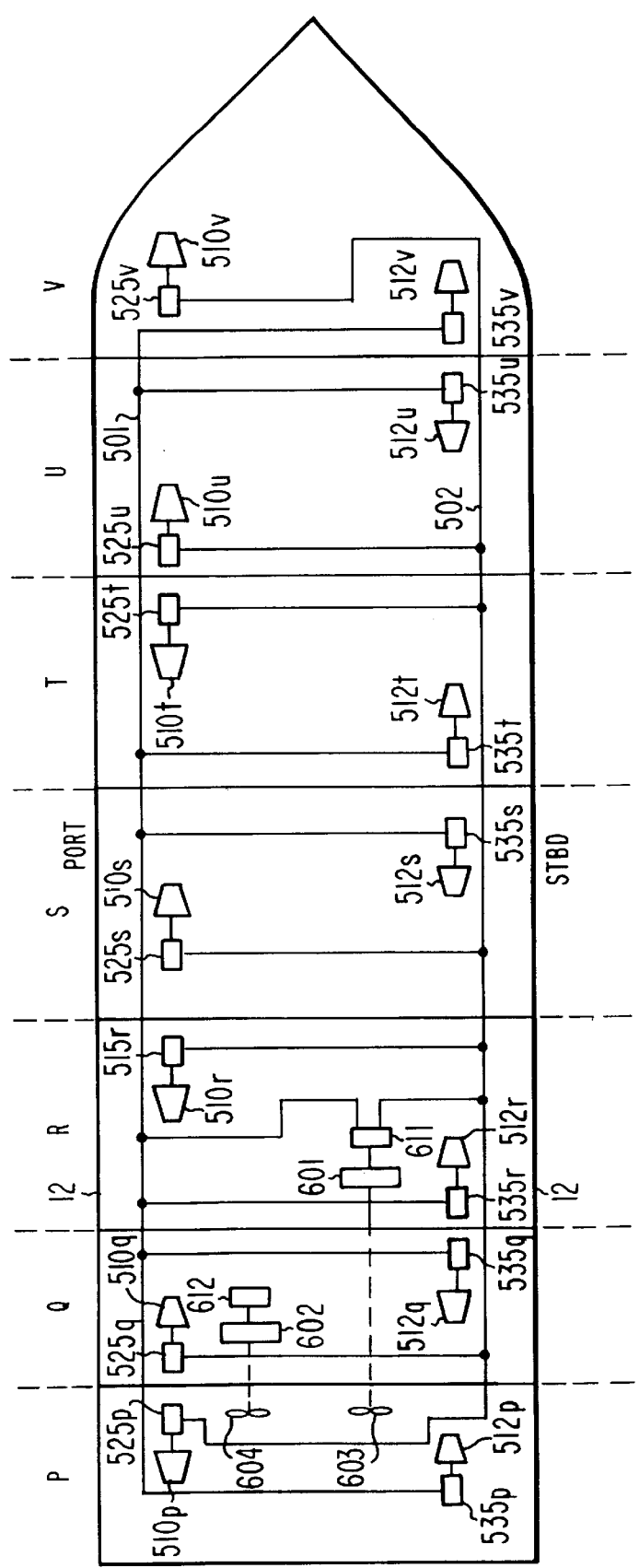
FIG. 6a is a simplified plan view of a ship including buses as described in conjunction with FIGS. 5a, 5b, and 5c, showing several zones, and also showing electrical buses extending through several zones, and also illustrating ship propulsion motors coupled to the buses for propelling the ship from what amounts to a distributed engine.

FIG. 6a is a simplified diagram of an arrangement according to another hypostasis or version of the invention, in which a distributed power source drives plural propulsion motors. In FIG. 6a, a ship includes watertight zones P, Q, R, S, T, U, and V. Power buses 501 and 502 serve all the illustrated zones. A motor-generator 510p in zone P provides power to bus 502 by way of a switchbox 525p, and a motor-generator 512p provides power to bus 501 by way of a switchbox 535p. A motor-generator 510q in zone Q provides power to bus 502 by way of a switchbox 525q, and a motor-generator 512q provides power to bus 501 by way of a switchbox 535q. Similarly, a motor-generator 510r in zone R provides power to bus 502 by way of a switchbox 525r, and a motor-generator 512r provides power to bus 501 by way of a switchbox 535r, and a motor-generator 510s in zone S provides power to bus 502 by way of a switchbox 525s, and a motor-generator 512s provides power to bus 501 by way of a switchbox 535s. For completeness in describing simplified FIG. 6a, a motor-generator 510t in zone T provides power to bus 502 by way of a switchbox 525t, and a motor-generator 512t provides power to bus 501 by way of a switchbox 535t, and a motor-generator 510u in zone U provides power to bus 502 by way of a switchbox 525u, and a motor-generator 512u provides power to bus 501 by way of a switchbox 535u, and a motor-generator 510v in zone V provides power to bus 502 by way of a switchbox 525v, and a motor-generator 512v provides power to bus 501 by way of a switchbox 535v. Also in FIG. 6a, a switchbox 611 in zone R couples power to a motor 601 from either or both buses 501 and 502 for driving a propulsive device illustrated as a propeller 603. A switchbox 612 in zone Q couples power to an electrical motor 602 from either or both of buses 501 and 502, for driving a propulsive device illustrated as a propeller 604. The illustrated arrangement allows either motor to be powered from either bus. In the event of damage to, or failure of, one of the buses, both motors can receive power from the undamaged bus, so that the ship can still make way. If one motor and one bus are damaged, the undamaged motor can receive power from the undamaged bus and the distributed power sources. Note that motors 601 and 602 occupy different watertight zones. They could, of course, occupy the same zone.

The dimensioning of the motor-generators 510p, 510q, 510r, 510s, 510t, 510u, 510v, 512p, 512q, 512r, 512s, 512t, 512u, and 512v may be determined by dividing the total ship's electric power requirement, and multiplying by the cushion, which might be selected to be 1.5, to establish the requisite generating capacity. The number of generators is determined by the capacity of the desired generator type, preferably man-portable generator types. In such an arrangement, any power shortfall in any one zone attributable to power consumption in that zone in excess of the generation or production in that zone is made up by power coupled from other zones by way of the bus.

Figure 6B:
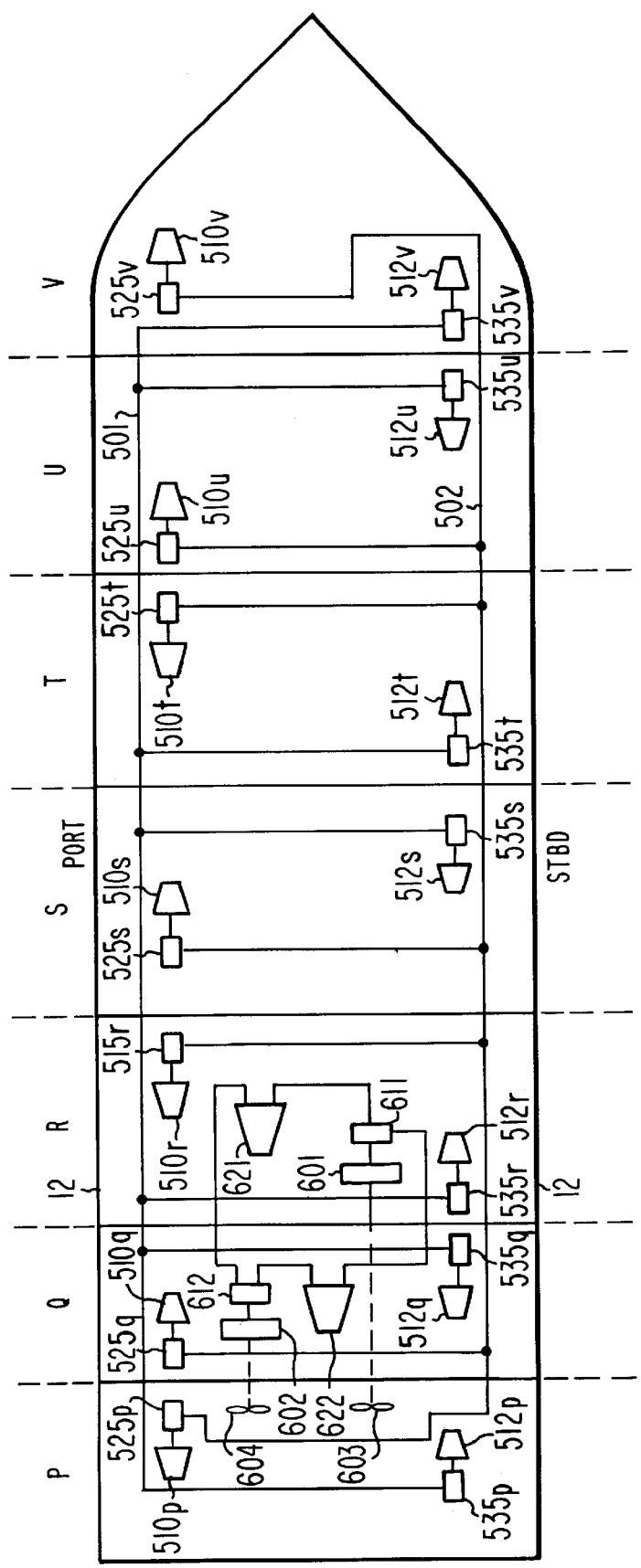
FIG. 6b is an arrangement similar to that of FIG. 6a, in which main propulsion motor-generators drive the propulsive motors.
Figure 6C:
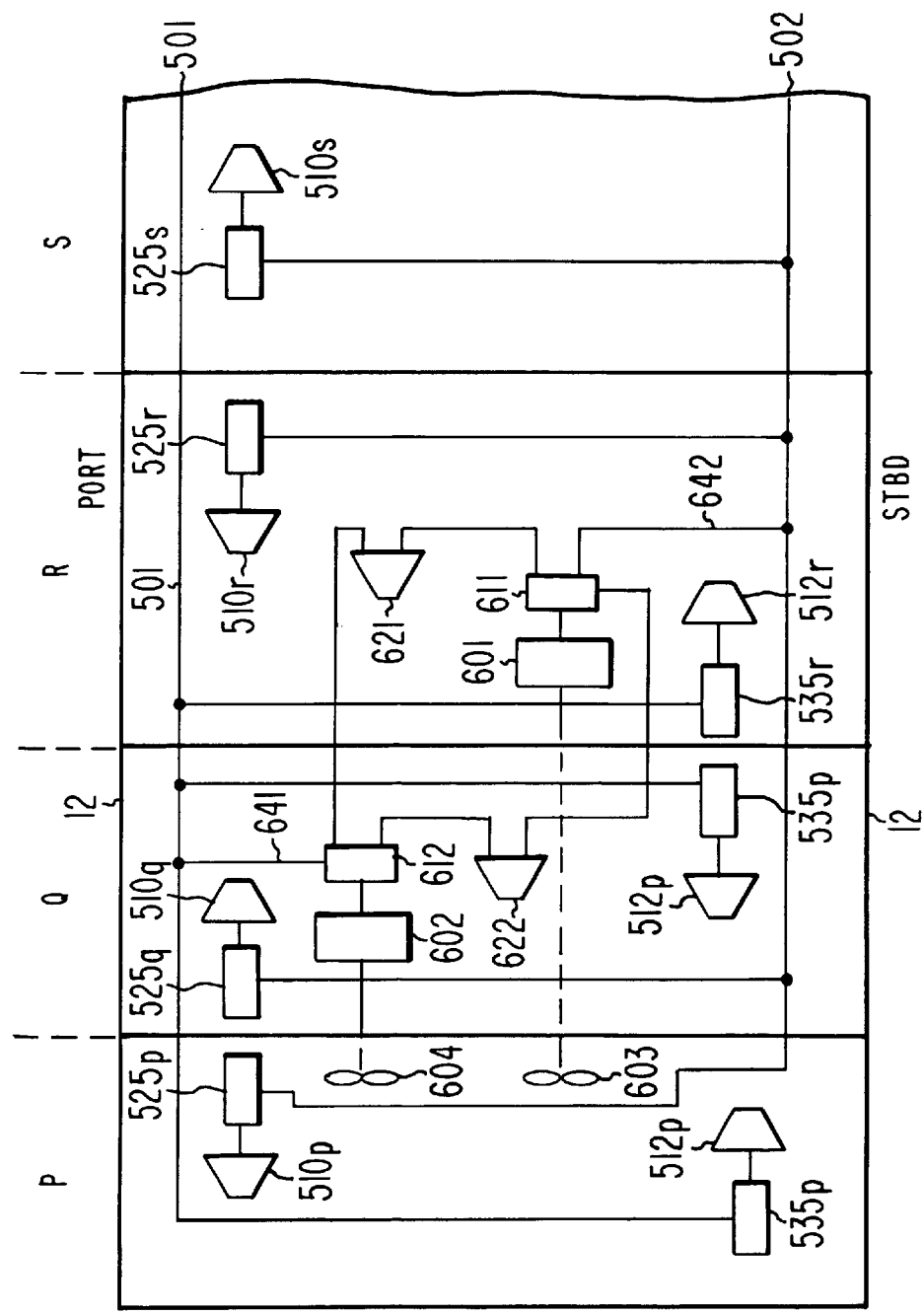
FIG. 6c is a plan view of a portion of the arrangement of FIG. 6b, showing further connections allowing powering of the propulsion motors from the distributed electrical power generating system, or powering of the ship as a whole from the main "propulsion" motor-generators.

FIG. 6b is generally similar to FIG. 6a, and corresponding elements are designated by like reference numerals. The arrangement of FIG. 6b provides a large motor-generator for each of the electrical propulsion motors. In the specific arrangement of FIG. 6b, there are two propulsion motors, namely 601 and 602, which are fed from switch boxes 611 and 612, respectively. Two larger motor-generators 621 and 622, located in zones R and Q, respectively, provide electricity for driving motors 601 and 602. More particularly, both motor-generators 621 and 622 provide power to switch boxes 611 and 612. Each switch box can be arranged to provide energy to its respective propulsion motor from either of the propulsion motor-generators. In the arrangement of FIG. 6b, however, power for the motors cannot be extracted from the buses. FIG. 6c is a representation of a portion of the structure of FIG. 6b, with additional conductor 641 connecting bus 501 to switch box 612 to allow switching of power so as to allow propulsion motor 602 to be driven from the distributed electrical power source by way of bus 501, and with an additional conductor 642 connecting bus 502 to switch box 611 to allow switching of power so as to allow propulsion motor 601 to be driven from the distributed electrical power source by way of bus 502. In addition, the presence of conductors 641 and 642 allows power to be coupled from motor-generators 621 and 622 to the bus for those situations in which more power may be required for shipboard equipment and less for propulsion.

Other embodiments of the invention will be apparent to those skilled in the art. For example, while the pumps for the salt water and heat exchange water have been described and illustrated as being low in the ship, they could be anywhere in the appropriate fluid path. While the two motor-generators 510 and 512 are described and illustrated as being located low in the ship's hull for protection against horizontally-travelling projectiles or missiles, those skilled in the art know that a tradeoff is involved in selection of the location, because the low-in-the-hull location may render the motor-generators more susceptible to damage by mines or torpedoes. Additionally, the low-in-the-hull location poses additional problems over a higher location, in that the combustion and exhaust must be piped a longer distance. The advent of pop-up missiles which dive on the ship during attack further complicates the problem of selecting a location. However, the use of plural small units allows selection of plural ones of the locations, so that any one missile or projectile strike is not likely to affect all of the generators. In the case, as with FIG. 6*b*, in which propulsion engine drive is not provided by multiple plural distributed generating capacity, ideally three generators would be used for each zone, which provide one and one-half times the requirement of the zone, assuming that the adjacent zones are similarly powered. In such an arrangement, total loss of the generating capacity in each zone, without damage to the critical equipment itself, can allow operation to continue in the affected zone by routing half the required electrical power from each adjacent undamaged zone. While a power cushion of 1.5 has been mentioned, those skilled in the art know that the cushion is selected based on the anticipated threat, cost, and other factors. The value may be greater or less than 1.5.

Thus, what is generally disclosed is a ship is divided into plural watertight zones. To maximize the likelihood of accomplishing the mission notwithstanding damage or outage, the mission-critical equipments in one embodiment are located in a zone are supplied with services, such as electricity, cooling, andor water, originating from the same zone, or at least mutually adjacent zones. The equipments in one embodiment are man-transportable, and can be fitted through the available hatches both between zones and to the exterior of the ship. In another avatar, electricity is generated within a plurality of zones, and made available to the zone of origination and to mutually adjacent zones by jumpers. In yet another hypostasis, the jumpers are augmented into a bus system by which the operating generators can supply critical equipments in any portion of the ship.

In yet another version, the distributed bus system can also drive the propulsive motors of the ship. Thus, a ship (10) according to an aspect of the invention includes a plurality of bulkheads (16*a*, 16*b*, 16*c*, 16*d*, 16*e*, 16*f*) separating the ship 10 (or more properly, its hull 12) into various nominally watertight zones (14*a*, 14*b*, 14*c*, 14*d*, 14*e*, 14*f*, 14*g*). In this context, the uppermost deck (18) which forms the upper boundary of such a watertight zone may be considered to be a bulkhead. Most of the zones (14*a*, 14*b*, 14*c*, 14*d*, 14*e*, 14*f*, 14*g*) or compartments are used for various purposes attributable to a mission of the ship, but some, such as the forwardmost compartment (14*a*), is provided as a buffer against the possibility of frontal collision, and this forwardmost zone (14*a*) is often used, for the most part, for storage, such as for anchor chain, and other nonessential uses. A plurality of passageways of standard sizes (326 of FIG. 3*a*) extend within at least some of the zones (14*a*, 14*b*, 14*c*, 14*d*, 14*e*, 14*f*, 14*g*), and others (316*d*) extend between at least some of the zones (14*a*, 14*b*, 14*c*, 14*d*, 14*e*, 14*f*, 14*g*) and adjacent zones (14*a*, 14*b*, 14*c*, 14*d*, 14*e*, 14*f*, 14*g*), and yet others (24*a*, 24*b*) extend between at least some of the zones (14*a*, 14*b*, 14*c*, 14*d*, 14*e*, 14*f*, 14*g*) and the outside of the ship. Those of the passageways (316*d*, 24*a*, 24*b*) which extend between zones (14*a*, 14*b*, 14*c*, 14*d*, 14*e*, 14*f*, 14*g*), or which extend between a zone and the outside of the ship are fitted with watertight fittings (316*dh*, 26*a*, 26*b*) or "doors." In a ship (10) according to an aspect of the invention, various critical users of cooling (492, 494, 594) are distributed about the zones (14*a*, 14*b*, 14*c*, 14*d*, 14*e*, 14*f*, 14*g*) of the ship (10). In this context, a critical user (492, 494, 594) of the service is one which, if not provided with cooling, directly and adversely affects a mission of the ship. A critical use in a combat vessel might be, for example, a cooling system which keeps a radar equipment at proper operating temperature. A plurality of chilled fluid producers (212*d*2, 212*e*1, 212*e*2, 212*e*3, 212*f*1) are provided. A chilled fluid producer (212*d*2, 212*e*1, 212*e*2, 212*e*3, 212*f*1) may be, for example, an air conditioning unit for generating cooled air, or a chilled-water producer, for generating chilled water for cooling a heat sink of an electrical apparatus. Each of the chilled fluid producers (212*d*2, 212*e*1, 212*e*2, 212*e*3, 212*f*1) has outer dimensions (LWD) selected to pass through one of the passageways (326, 316*d*, 24*a*, 24*b*), so that dimensionally, any one of the chilled fluid producers (212*d*2, 212*e*1, 212*e*2, 212*e*3, 212*f*1) can be removed from the ship (10) without structural modification of the ship (10). Each of the chilled fluid producers (212*d*2, 212*e*1, 212*e*2, 212*e*3, 212*f*1) is located in one of the zones (14*a*, 14*b*, 14*c*, 14*d*, 14*e*, 14*f*, 14*g*), and each of the zones having a requirement for cooling of critical equipment (14*d*, 14*e*, 14*f*) contains at least three of the chilled fluid producers (212*d*2, 212*e*1, 212*e*2, 212*e*3, 212*f*1). The number of the chilled fluid producers (212*d*2, 212*e*1, 212*e*2, 212*e*3, 212*f*1) in each of the zones (14*a*, 14*b*, 14*c*, 14*d*, 14*e*, 14*f*, 14*g*) is at least equal to that number which provides an amount of cooling exceeding the amount of the cooling required by the critical users of the zone in which the chilled fluid providers are located. Thus, cooling service is provided in each zone, so that damage to another zone cannot cut off the cooling service to an undamaged zone, and the mission of the equipments in the undamaged zone can continue. The chilled fluid may be air, water, or any other suitable fluid.

In a particular avatar of the invention, each of the chilled fluid producers (212*d*2, 212*e*1, 212*e*2, 212*e*3, 212*f*1) requires a flow of water into which heat can be rejected. The ship (10) further includes, within each zone (14*a*, 14*b*, 14*c*, 14*d*, 14*e*, 14*f*, 14*g*) requiring cooling of critical equipment (492, 494, 594), first and second sources (210*e*1, 210*e*2 in example zone 14*e*) of heat exchange water. The heat exchange water may be sea water pumped directly from outside the ship (FIG. 2*a*), or it may be fresh water (or, of course, some other heat exchange fluid) in thermal communication (by way of heat exchanger such as 310) with sea water pumped from outside of the ship (10), so that the heat exchange water ultimately exchanges heat with the ocean. Plumbing (410*des*, 410*der*, 428*d*2*s*, 428*d*2*r*) is coupled to the first and second heat exchange fluid sources (210*e*1, 210*e*2 in example zone e, $312_1$, $312_3$ in FIG. 3*b*) and to the chilled fluid producers (212*d*2, 212*e*1, 212*e*2, 212*e*3, 212*f*2) within the zone (14*e*), so that (a) at least one (212*e*1) of the chilled fluid producers (212*d*2, 212*e*1, 212*e*2, 212*e*3, 212*f*2) receives heat exchange fluid or water from the first source (210*e*1 in example zone 14*e*, $312_1$ in FIG. 3*b*) of heat exchange fluid or water within that zone, and (b) at least one other (212*e*2) of the chilled fluid producers (212*d*2, 212*e*1, 212*e*2, 212*e*3, 212*f*2) receives heat exchange water from the second source (210*e*2 in example zone e, $312_3$ in FIG. 3*b*) of heat exchange water within that zone.

In a preferred embodiment of the avatar, the first source (210e1 in example zone 14e) of heat exchange water within a first zone (14e) is adjacent a first side of a vertically oriented bulkhead (16d) separating the first zone (14e) from a second zone (14d), and the ship (10) further includes a third source (210d2) of heat exchange water located in the second zone (14d), adjacent a second side of the vertically oriented bulkhead (16d). A heat exchange fluid path (220d) extends through the bulkhead (16d) near the first (210e1) and third (210d2) sources of heat exchange water. The heat exchange fluid path (220d) through the bulkhead (16d) is closed off with at least one removable watertight cover (220dc1, 220dc2) to avoid the potential for flooding between the connected ones (14d, 14e) of the zones (14a, 14b, 14c, 14d, 14e, 14f, 14g), and is available for connection to one of the first (210e1) and third (210d2) sources of heat exchange water and to at least one of the chilled fluid producers (212d2, 212e1) in the adjacent (14d) and first (14e) ones, respectively, of the zones (14a, 14b, 14c, 14d, 14e, 14f, 14g). This arrangement allows damage to one of the heat exchange fluid sources (210e1, 210e2) in one zone (example zone 14e) to be bypassed, by connecting the chilled fluid producer or cooling fluid sources (212e1) or generators in the one zone (example zone 14e) to the (presumably undamaged) source (210d2) of heat exchange fluid in the next adjacent zone (14d). In this preferred embodiment, each of the first (210e1) and third (210d2) sources of heat exchange water comprises a vertically oriented distribution pipe (210e1s) for the flow of the heat exchange water between a location (216e1s) below the sources of chilled fluid (212e1, 212e3, 212d2) to a location at the same height as the sources of chilled fluid (212e1, 212e3, 212d2), together with a pump (214e1 or 314e1) located near the bottom of the distribution pipe (210e1s), for pumping the heat exchange water to the chilled fluid provider (212e1, 212e3, 212d2). As mentioned, the heat exchange fluid may be fresh or salt water (or any other suitable heat exchange medium, for that matter). If the heat exchange fluid circulating through the chilled fluid producers or cooling fluid generators is fresh water, the arrangement may also include a fresh-water-to-salt-water heat exchanger (310) located anywhere along the vertically oriented distribution pipe, but preferably near the bottom thereof.

In another embodiment of the invention, a zoned ship (10) includes a fuel source (520, 530) associated with each of the zones (14a, 14b, 14c, 14d, 14e, 14f, 14g) containing critical equipment requiring cooling, and at least first and second electrical power generators (510, 512) located in each of the zones (14a, 14b, 14c, 14d, 14e, 14f, 14g) and coupled to the fuel source (520, 530), for providing electrical power to the chilled fluid producers (212d2, 212e1, 212e2, 212e3, 212f2) within corresponding zones (14a, 14b, 14c, 14d, 14e, 14f, 14g). At least one (212e1) of the chilled fluid producers (212d2, 212e1, 212e2, 212e3, 212f2) is coupled (by way of path 527, power panel 526, and switchboard 525) to the first electrical power generator (510), and at least one other (212e2) of the chilled fluid producers (212d2, 212e1, 212e2, 212e3, 212f2) is coupled (by way of power panel 538, path 535', and switch board 535) to the second electrical power generator (512). In another manifestation of the invention, the ship has a fuel source (520, 530) associated with each of the zones (14a, 14b, 14c, 14d, 14e, 14f, 14g) supporting critical equipment. First (510) and second (512) electrical power generators are located in each of the zones (14a, 14b, 14c, 14d, 14e, 14f, 14g) and coupled to the fuel source (520, 530 respectively), for providing electrical power to the critical users (492, 594) within the corresponding zone (14e). At least one of critical users (492) is coupled to the first electrical power generator (510), and at least one of the chilled fluid producers (212d2, 212e1, 212e2, 212e3, 212f2) is coupled to the second electrical power generator (512).

Another embodiment of the invention lies in a ship (10) comprising a plurality of bulkheads (16a, 16b, 16c, 16d, 16e, 16f) separating the ship (10) into various zones (14a, 14b, 14c, 14d, 14e, 14f, 14g) which are nominally watertight. Various critical users of electricity (492, 594) are distributed throughout the ship, in at least some (14e) of the zones (14a, 14b, 14c, 14d, 14e, 14f, 14g) In this context, a critical user of the service is one which, if not provided with services, directly and adversely affects a mission of the ship. A source (520, 530) of fuel is associated with each the zones (14a, 14b, 14c, 14d, 14e, 14f, 14g) which contains one or more of the critical users of electricity. At least one fuel-operated electrical generator (510 or 512) is associated with each one of the zones (14a, 14b, 14c, 14d, 14e, 14f, 14g) containing one or more critical users of electricity. The electrical generator (510 or 512) associated with a given zone (14e) is fueled from the source (520 or 530) of fuel associated with the one of the zones (14a, 14b, 14c, 14d, 14e, 14f, 14g) which the electrical generator occupies. The electrical generator (510, 512) is dimensioned to produce at least a particular amount of electrical power, where the particular amount of electrical power is the sum of (a) the amount of electrical power required by the critical users of electricity within the associated one (14e) of the zones (14a, 14b, 14c, 14d, 14e, 14f, 14g), plus (b) half the amount of electrical power required by the critical users of electrical power of that one (14d or 14f) of the zones (14a, 14b, 14c, 14d, 14e, 14f, 14g) adjacent to the associated one (14e) of the zones (14a, 14b, 14c, 14d, 14e, 14f, 14g) which has the larger electrical power consumption of the two. The embodiment may also include an electrical jumper system (525, 525', 526, 526', 527, 535, 535', 536, 536', 501, 502) for controllably coupling the electrical generator (510 or 512) of each one of the zones (14e, for example) with at least some of the critical users of electricity of the two zones (14d or 14f) adjacent the one of the zones (14e). This arrangement allows the critical user (492, 594) in a zone (14e) in which the electrical generator (510, 512) is damaged to continue to operate, with electrical power provided to the critical equipment (492, 594) of the zone (14e) with damaged generator (510, 512) by way of jumpers (that portion of 501, 502 extending from one zone to an adjacent zone) from the two adjacent (presumably undamaged) zones (14d, 14f). Since each undamaged generator is capable of supplying the amount of electrical power required for its own critical users, plus half the load of the adjacent zone, all critical operations can continue notwithstanding damage to all the generators in one or more non-contiguous zones.

In a particularly advantageous manifestation, sufficient interconnections among the electrical jumper system are provided so that the electrical jumper system constitutes a bus (501, 502) by which the electrical power produced by all on-line ones of the electrical generators (510p, 510q, 510r, 510s, 510t, . . . , 512p, 512q, 512r, . . . ) of a plurality of the zones (14a, 14b, 14c, 14d, 14e, 14f, 14g, . . . P, Q, R, S, T, U, V) can be combined for distribution among the critical users of electricity.

In another hypostasis of the invention, the ship includes electrically energized propeller drive means or motors (601, 602). A controllable means (switch boxes 611, 612) is provided for coupling the bus (501, 502) with the electrically energized propeller drive means (601, 602), whereby the on-line ones of the electrical generators ($510_x$, $512_x$, where x is any letter) can provide propulsive power for the ship. In another version of this hypostasis, a main fuel-operated motor-generator is controllably coupled to the propeller drive means, for providing propulsion during those intervals during which the electrical generators are not providing propulsion power for the ship.

Another embodiment according to the invention is that of a ship having one or more missions, and including a plurality of watertight bulkheads (16a, 16b, 16c, 16d, 16e, 16f) dividing the ship into nominally watertight zones (14a, 14b, 14c, 14d, 14e, 14f, 14g, P, Q, R, . . . ). Mission-critical equipment (492, 594) is located in at least some of the zones (14a, 14b, 14c, 14d, 14e, 14f, 14g). The mission-critical equipment (492, 594) requires services in the form of at least one of air conditioning (212e1, 212e2), fresh water, and electrical power. In this embodiment, service equipment (212e1, 212e2, 510, 512) is located within each of the zones (14a, 14b, 14c, 14d, 14e, 14f, 14g). The service equipment of each one of the zones (14a, 14b, 14c, 14d, 14e, 14f, 14g) is sufficient to independently provide the at least one of air conditioning, fresh water, and electrical power to the mission-critical equipment located within the one of the zones (14a, 14b, 14c, 14d, 14e, 14f, 14g) in which the service equipment is located, whereby damage to any part of the ship other than the one of the zones (14a, 14b, 14c, 14d, 14e, 14f, 14g) in which the service equipment is located does not interfere with that part of the mission of the mission-critical equipment located in the one of the zones (14a, 14b, 14c, 14d, 14e, 14f, 14g). In a particular version of this embodiment, the service equipment comprises a fuel-consuming generator (510, 512), and the service equipment further comprises a tank of fuel (520, 530) for the generator (510, 512).

A ship according to another embodiment of the invention has one or more missions. The ship comprises a plurality of watertight bulkheads (16a, 16b, 16c, 16d, 16e, 16f) dividing the ship into nominally watertight zones (14a, 14b, 14c, 14d, 14e, 14f, 14g), and mission-critical equipment (492, 594) located in at least some of the zones (14a, 14b, 14c, l4d, 14e, 14f, 14g). The mission-critical equipment requires services in the form of at least one of air conditioning, fresh water, and electrical power. Service equipment is located within each of the zones (14a, 14b, 14c, 14d, 14e, 14f, 14g), so that the service equipment of each one of the zones (14a, 14b, 14c, 14d, 14e, 14f, 14g) is sufficient to independently provide (a) the at least one of air conditioning, fresh water, and electrical power to the mission-critical equipment located in the one of the zones (14a, 14b, 14c, 14d, 14e, 14f, 14g), together with (b) half the amount of the at least one of air conditioning, fresh water, and electrical power required by that one of the zones (14a, 14b, 14c, 14d, 14e, 14f, 14g) adjacent the one of the zones (14a, 14b, 14c, 14d, 14e, 14f, 14g), whereby damage (complete or partial) to the services of any single one of the zones (14a, 14b, 14c, 14d, 14e, 14f, 14g) of the ship does not interfere with the supply of services to that part of the mission-critical equipment located in the single one of the zones (14a, 14b, 14c, 14d, 14e, 14f, 14g).

What is claimed is:

1. A ship, comprising:
    a plurality of bulkheads separating said ship into various zones which are nominally watertight;
    a plurality of passageways of standard sizes extending within at least some of said zones, and extending between at least some of said zones and adjacent zones, and between at least some of said zones and the outside of said ship, those of said passageways which extend between zones, or which extend between a zone and the outside of said ship being fitted with watertight fittings;
    various critical users of cooling, wherein a critical user of said service is one which, if not provided with said one of said cooling, directly and adversely affects a mission of said ship, said critical users being distributed about said zones of said ship;
    a plurality of chilled fluid producers, each of said chilled fluid producers having dimensions selected to pass through one of said passageways, each of said chilled fluid producers being located in one of said zones, and each of said zones containing at least three of said chilled fluid producers, the number of said chilled fluid producers in each of said zones being at least equal to that number which provides an amount of cooling exceeding the amount of said cooling required by said critical users of the zone in which said chilled fluid providers are located; and
    a chilled fluid coupling coupled to at least one of said chilled fluid producers within a zone and to at least one of said critical users in said zone, for providing cooling fluid from said chilled fluid producer to said critical user.

2. A ship according to claim 1, wherein each of said chilled fluid producers requires a flow of water into which heat can be rejected, said ship further comprising:
    within each zone, first and second sources of heat exchange water, which water ultimately exchanges heat with the ocean; and
    plumbing coupled to said first and second sources of heat exchange water and to said chilled fluid producers within said zone, so that (a) at least one of said chilled fluid producers receives heat exchange water from said first source of heat exchange water, and (b) at least one other of said chilled fluid producers receives heat exchange water from said second source of heat exchange water.

3. A ship according to claim 2, wherein said first source of heat exchange water is adjacent a first side of a bulkhead of a first zone, said ship further comprising:
    a third source of heat exchange water located in a second zone adjacent a second side of said bulkhead;
    a fluid path extending through said bulkhead near said first and third sources of heat exchange water, said fluid path being closed off to avoid the potential for flooding between zones, and being available for connection to one of said first and third sources of heat exchange water and to at least one of said chilled fluid producers in said adjacent and first zones, respectively.

4. A ship according to claim 3, wherein each of said first and third sources of heat exchange water comprises:
    a vertically oriented distribution pipe for the flow of said heat exchange water between a location below said sources of chilled fluid to a location at the same height as said sources of chilled fluid; and
    a pump located near the bottom of said distribution pipe, for pumping said heat exchange water to said chilled fluid provider.

5. A ship according to claim 4, wherein said second source of heat exchange water comprises:
    a vertically oriented distribution pipe for the flow of said heat exchange water between a location below said sources of chilled fluid to a location at the same height as said sources of chilled fluid; and
    a pump located near the bottom of said distribution pipe, for pumping said heat exchange water to said chilled fluid provider.

6. A ship according to claim 1, wherein at least some of said sources of chilled fluid are air conditioners in which said cooled fluid is air, and which reject heat from said air ultimately to heat exchange water.

7. A ship according to claim 1, further comprising:

a fuel source associated with each of said zones;

first and second electrical power generators located in each of said zones and coupled to said fuel source, for providing electrical power to said chilled fluid producers within corresponding zones, at least one of said chilled fluid producers being coupled to said first electrical power generator, and at least one other of said chilled fluid producers being coupled to said second electrical power generator.

8. A ship according to claim 1, further comprising:

a fuel source associated with each of said zones;

first and second electrical power generators located in each of said zones and coupled to said fuel source, for providing electrical power to said critical users within corresponding zones, at least one of critical users being coupled to said first electrical power generator, and at least one of said critical users being coupled to said second electrical power generator.

9. A ship, comprising:

a plurality of bulkheads separating said ship into various zones which are nominally watertight;

various critical users of electricity, wherein a critical user of said electricity is one which, if not provided with said one of said electricity, directly and adversely affects a mission of said ship, said critical users being distributed throughout at least some of said zones of said ship;

a source of fuel associated with each said zones which contains one or more of said critical users of electricity;

at least one fuel-operated electrical generator associated with each one of said zones containing one or more critical users of electricity, said electrical generator associated with a given zone being fueled from said source of fuel associated with said one of said zones, said electrical generator also being dimensioned to produce at least a particular amount of electrical power, said particular amount of electrical power being the sum of (a) the amount of electrical power required by said critical users of electricity within said one of said zones, plus (b) some additional amount of electrical power beyond said amount of electrical power required by said critical users of electricity of that one of the zones adjacent to said one of said zones which has the larger electrical power consumption of the two; and an electrical jumper system for controllably coupling the electrical generator of each one of said zones with at least some of the critical users of electricity of the two zones adjacent said one of said zones.

10. A ship according to claim 9, wherein said additional amount of electrical power is about one-and-one-half times said amount of electrical power required by said critical users of electricity within said zone.

11. A ship according to claim 9, further comprising sufficient interconnections among said electrical jumper system so that said electrical jumper system constitutes a bus by which the electrical power produced by all on-line ones of said electrical generators of a plurality of said zones can be combined for distribution among said critical users of electricity.

12. A ship according to claim 11, further comprising:

electrically energized propeller drive means; and controllable means coupling said bus with said electrically energized propeller drive means, whereby said on-line ones of said electrical generators can provide propulsive power for said ship.

13. A ship according to claim 12, further comprising:

a main fuel-operated motor-generator controllably coupled to said propeller drive means, for providing propulsion during those intervals during which said electrical generators are not providing propulsion power for said ship.

14. A ship having one or more missions, said ship comprising:

a plurality of watertight bulkheads dividing said ship into zones;

mission-critical equipment located in at least some of said zones, said mission-critical equipment requiring services in the form of at least one of air conditioning, fresh water, and electrical power; and service equipment located within each of said zones, said service equipment of each one of said zones being sufficient to independently provide said at least one of air conditioning, fresh water, and electrical power to said mission-critical equipment located in said one of said zones, whereby damage to any part of said ship other than said one of said zones does not interfere with that part of said mission of said mission-critical equipment located in said one of said zones.

15. A ship according to claim 14, wherein said service equipment comprises a fuel-consuming generator, and said service equipment further comprises a tank of fuel for said generator.

16. A ship having one or more missions, said ship comprising:

a plurality of watertight bulkheads dividing said ship into zones;

mission-critical equipment located in at least some of said zones, said mission-critical equipment requiring services in the form of at least one of air conditioning, fresh water, and electrical power; and service equipment located within each of said zones, said service equipment of each one of said zones being sufficient to independently provide (a) said at least one of air conditioning, fresh water, and electrical power to said mission-critical equipment located in said one of said zones, together with (b) half the amount of said at least one of air conditioning, fresh water, and electrical power required by that one of said zones adjacent said one of said zones, whereby damage to any single one of said zones of said ship does not interfere with the supply of services to that part of said mission-critical equipment located in said single one of said zones.

* * * * *